US006511572B1

(12) United States Patent
Jensen et al.

(10) Patent No.: US 6,511,572 B1

(45) Date of Patent: Jan. 28, 2003

(54) METHOD AND AN APPARATUS FOR FORMING CUT-OUTS AND TRANSVERSE WELDING-SEAMS IN A SHEET OF FILM

(75) Inventors: John Buk Jensen, Munkebo (DK); Jens Peder Rasmussen, Odense SØ(DK); Christian Dam, Odense SV. (DK); Christian Bøg Jørgensen, Bayswater (AU)

(73) Assignee: Roll-O-Matic A/S, Odense (DK)

( * ) Notice: Subject to any disclaimer, the term of this patent is extended or adjusted under 35 U.S.C. 154(b) by 0 days.

(21) Appl. No.: 09/807,311

(22) PCT Filed: Oct. 15, 1999

(86) PCT No.: PCT/DK99/00560

§ 371 (c)(1), (2), (4) Date: Jul. 10, 2001

(87) PCT Pub. No.: WO00/23264

PCT Pub. Date: Apr. 27, 2000

(30) Foreign Application Priority Data

Oct. 19, 1998 (DK) .......................................... 1998 01334

(51) Int. Cl.[7] .............................................. B32B 31/00

(52) U.S. Cl. .................... 156/252; 156/290; 156/308.4; 156/502

(58) Field of Search ................................ 156/229, 250, 156/252, 290, 308.2, 308.4, 494, 502

(56) References Cited

U.S. PATENT DOCUMENTS

| | | | | |
|---|---|---|---|---|
| 3,550,494 A | | 12/1970 | Adams | 83/99 |
| 3,748,205 A | | 7/1973 | Adams | 156/267 |
| 4,023,470 A | | 5/1977 | Van Der Meulen | 93/35 R |
| 4,571,235 A | | 2/1986 | Benoit | 493/195 |
| 5,573,489 A | | 11/1996 | Letendre et al. | 493/194 |
| 5,935,367 A | * | 8/1999 | Hollenbeck | 156/252 |
| 6,159,136 A | * | 12/2000 | Belias et al. | 493/198 |
| 6,196,717 B1 | * | 3/2001 | Belias et al. | 383/37 |

FOREIGN PATENT DOCUMENTS

| | | |
|---|---|---|
| DE | 3030707 | 3/1981 |
| DE | 3725876 | 2/1989 |
| EP | 0761425 | 3/1997 |

* cited by examiner

*Primary Examiner*—James Sells
(74) *Attorney, Agent, or Firm*—Ladas & Parry

(57) ABSTRACT

The invention relates to a method of forming cutouts (4) and transverse welding seams (10) in a sheet of film (5) that is advanced continuously at high velocity, wherein the cutouts (4) constitute areas that are delimited by cutting lines (6, 7), wherein the method comprises the following steps: a) the formation of the cutouts (4) in a sheet section with high sheet tension with cutting lines (7) that extend longitudinally of the sheet of film (5), and cutting lines (7) that extend transversely of the sheet of film, said cutting lines featuring a number of interruptions (8) that constitute support points whereby the cutouts (4) continue to be coherent with the sheet of film (5) at the support points, b) subsequent formation of the transverse welding seams (10) in a sheet section with low sheet tension.

13 Claims, 4 Drawing Sheets

METHOD AND AN APPARATUS FOR FORMING CUT-OUTS AND TRANSVERSE WELDING-SEAMS IN A SHEET OF FILM

The invention relates to a method of forming cutouts and transverse welding seams in a web of film that is advanced continuously at high velocity according to the preamble of claim 1.

Such methods are known and are used eg for processing webs of film for plastics bags. In case of a particular type of bags, a perforation line is situated between two welding seams, wherein the one welding seam forms the bottom of one bag, and the other welding seam forms the top of the adjacent bag, and wherein it is possible to separate the thus successive bags in the web by means of the perforation line. In these types of bags, a further central cutout is formed at the top of each bag, whereby separate handle parts remain at each side.

Such a method is disclosed in U.S. Pat. No. 5,573,489. This patent also describes an apparatus for forming plastic bags, wherein a web of film is provided with cutouts and transverse welding seams. A method for forming bags form layers of intermittently advanced film is known from U.S. Pat. No. 3,748,205.

It is necessary to have very low stresses in the welding zone and the subsequent cooling zone since here the welding seam is very soft and will yield even to small stresses. During welding some degree of deformation and changes in the length of the web usually occur, and this has made it necessary to detect each welding in order to be able to position the cutout correctly. This detection is to be carried out for each web of film, and the cutout is positioned relative thereto, also separately for each web, which results in a drastic increase in the costs of the necessary process equipment. Moreover, it becomes difficult to increase the rate of web conveyance since the time available for carrying out the determination of the welding seam position decreases with increased web conveyance rates. The alternative has been to live with certain variations in the position of the cutout relative to the welding.

It is the object of the invention to provide a method by which it is possible to accomplish high web rates and less costly process equipment and whereby it is possible to avoid these known variations while simultaneously eliminating the need for detecting the position of each welding prior to positioning of the cutout.

This is obtained by a method of the kind described in the introductory part of claim 1 and further comprising the method steps mentioned in the characterizing part of claim 1.

When, as stated, the section to be removed from the web is allowed to continue to be attached thereto in a number of support points at the cutting lines that extend transversally of the web, the web can still be exposed to stresses in its longitudinal direction without ensuing deformation, and hereby it becomes possible to freely select at which point in the process the cutouts are to be accomplished. In that case it will be expedient to perform the cutouts using blade parts prior to the weldings and the ensuing deformations of the web of film since the welding can subsequently be carried out completely accurately in relation of the cutouts.

Thereby the welding is the last process to be performed on the web that requires accuracy, and consequently it is not necessary to subsequently determine the exact location of the weldings, as was previously the case. Even in case several adjacently extending webs of film are processed in a die-cutting or cutting unit that extends across all processed webs of film and are operated as one unit, and are subsequently processed in a common welding unit operated in accordance with the same principle, cutouts and weldings will be positioned accurately relative to each other, the cutouts being produced before the weldings.

Obviously the cutting lines described above are not necessarily rectilinear; thus the cutout can be eg circular or oval, and the support points will then be positioned such that stresses in the longitudinal direction of the web can be transmitted from the web to the cutout.

A number of support points can be established in the cutting lines that extend longitudinally in order to ensure that the cutout remains coherent with the web of film in the subsequent process steps.

In particular in the manufacture of bags, it is convenient that a welding seam is formed at both sides of one of the cutting lines that extend transversally to the web of film, and that a perforation is arranged between the welding seams, which extends transversally to the film. Here the perforation serves to enable the individual bags to be separated from each other, and in that case the welding seams will form bottom and top of each their successive bag.

As featured in claim 3, the transverse perforations and one of the cutting lines that extend transversally to the web of film will coincide in an area and be formed in the same process step, and wherein the cutting line constitutes the perforations in this area. The support points of the cutting line have a lower strength than a perforation line, and therefore it will be easier to remove the cutout if it is coherent with the remainder of the web only in the support points of the cutting line and not at the perforation.

According to an alternative embodiment of the invention as featured in claim 4, the transverse perforations and one of the cutting lines that delimit the cutouts transversally extend side-by-side in an area and are formed in each their process step. Here the perforation line will not be torn when the cutout is removed due to the relative strength of this line compared to the somewhat weaker support points in the cutting line.

Removal of the material from the cutouts can be accomplished subsequently in, a simple manner by tearing the support points as featured in claim 5.

According to claim 7 the invention also relates to an apparatus for manufacturing cutouts and transverse welding seams in a web of film that is advanced continuously at high velocity wherein the cutouts constitute sections that are delimited by cutting lines wherein a first workstation is configured for forming cutouts delimited by cutting lines in the longitudinal and transverse directions of the film and that a subsequent welding station is configured for forming transverse welding seams. The apparatus further comprise-fist blade parts that form the cutting lines in the longitudinal direction of the web of film, and second blade parts that form the cutting line in the transverse direction of the web of film and have interruptions with a view to forming the second cutting lines with interruptions.

By means of the apparatus it is possible to produce cutouts and welding seams in continuously advanced webs of film, wherein the cutouts and welding seams are accurately positioned relative to each other. This can be accomplished without detections being carried out of the location of welding seams since it is possible with the apparatus to produce the cutouts in the web of film before the weldings.

According to claim 8, the welding station can be configured for forming a welding seam at each their side of one of the cutting lines that extend transversally of the web of film, and such that it is also a perforation tool configured for producing a transverse perforation between the two welding seams.

The features according to claim 8 can be applied when the apparatus is configured for the manufacture of bags.

Convenient embodiments of the apparatus will appear from claims 9 and 10.

The following is a detailed description of an exemplary method according to the invention with reference to the figures shown in the drawing, wherein FIG. 1 shows three sections of a web of film, wherein a process is executed in each section;

Figure 1:
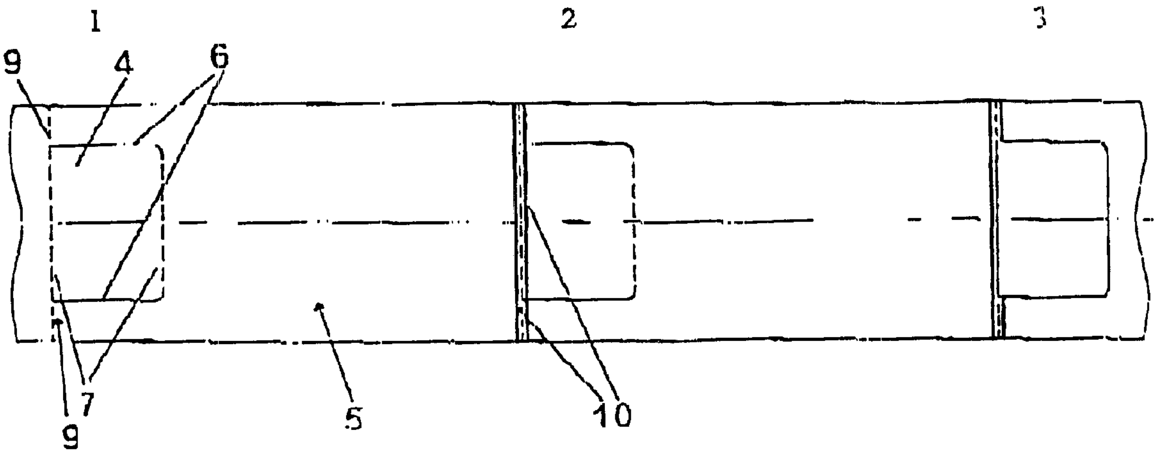

FIG. 1 shows three sections of a web of film 5, wherein a processing occurs in each section towards finished bags that are still, via perforation lines, coherent in the web of film. In a first web section 1 where the web tension is kept high, the first processing is effected in the form of a cutout 4 that consists of cutting lines 6 extending along the web 5 and extending uninterrupted between two cutting lines 7 that extend transversally to the web 5. The two latter cutting lines 7 are, at intervals, provided with interruptions 8 that form support points serving to ensure that the cutout 4 continues to be coherent with the remainder of the web of film 5. In extension of one of the cutting lines that extend transversally to the web, perforation lines 9 are established that extend from the longitudinally extending cutting lines 6 and out to the rim. They enable separation of the individual bags from each other.

In the second section 2 the subsequently established weldings 10 are shown that extend transversally to each their side of the perforation line 9. In the method according to the invention the cutout 4 is established in a web section with high web tension before the welding. Hereby a high degree of accuracy is obtained with regard to the positioning of the cutout and the perforation, and the welding can be located exclusively on the basis of the expected position of the cutout 4. During the welding proper, which in this example comprises two welding seams—one at each side of the perforation line 9, a certain change in the length of the web 5 can occur, but in view of the fact that no subsequent processes are to take place that are critical with regard to position, this is of no consequence. In a last process the cutout 4 is removed by tearing of the support points 8. This is illustrated in the third web section shown.

The individual bags are still coherent at the perforation lines 9 and can thus subsequently be rolled up.

Figure 2:
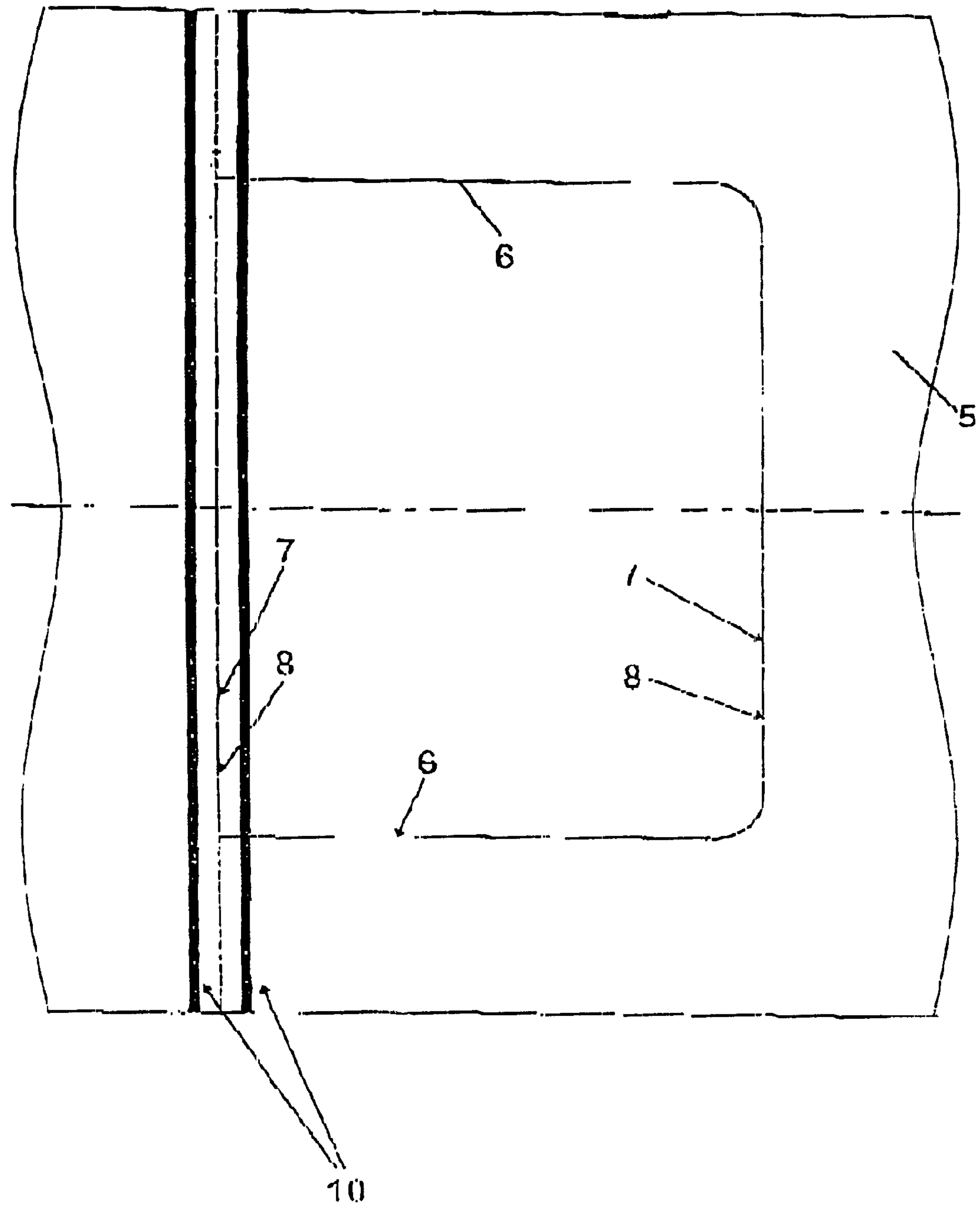
FIG. 2 is an enlarged sectional view of a section of a web of film with perforation, cutout and welding.

FIG. 2 is an enlarged sectional view of the weldings 10 and the cutout 4. It will appear that the support points 8 constitute only a small part of the length of the cutting line 7 transversally of the web of film 5, and for each material this part should be determined on the basis of the material strength and the requisite stress to be transmitted via the support points.

Figure 3:
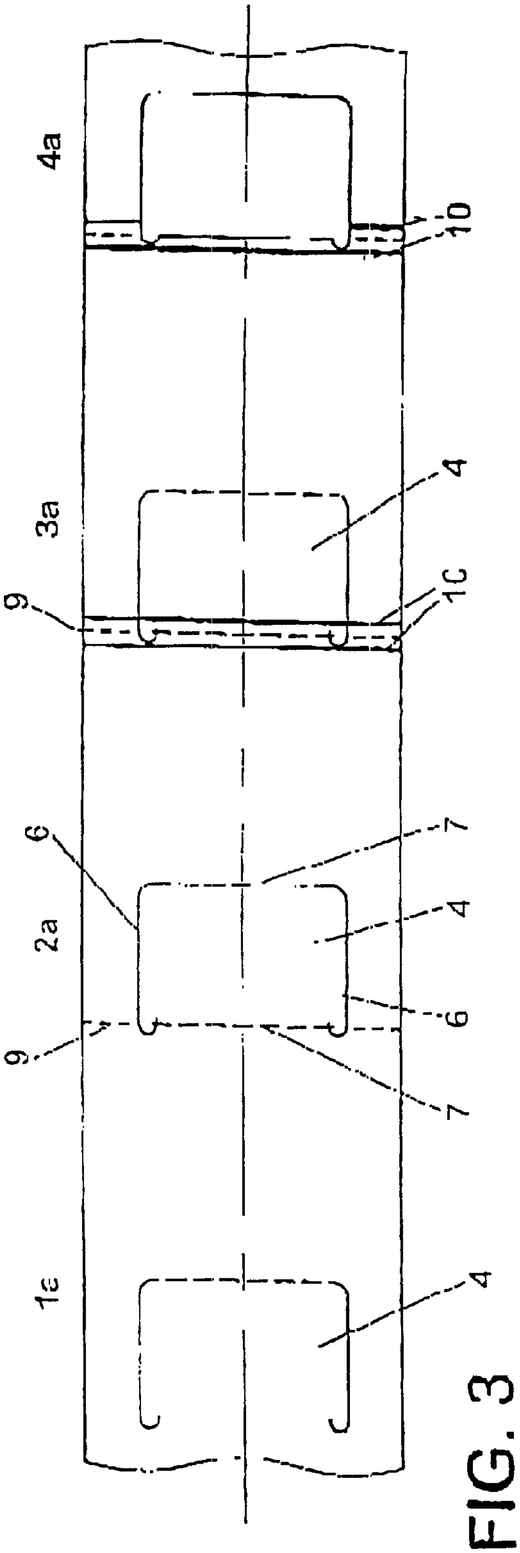
FIGS. 3 and 4 show two different embodiments of the course of the cutout.

FIG. 3 is a further example of a process course in accordance with the method wherein the cutout 4 is formed in a first process step 1*a,* the perforation is formed in a second step 2*a,* the weldings 10 in a third step 3*a,* and finally the cutout 4 is removed in step 4*a.* As will appear at 2*a,* the cutting line 7 is formed simultaneously with the perforation 9, and the cutting line 7 constitutes the perforation line between the longitudinally extending cutting lines 6.

Figure 4:
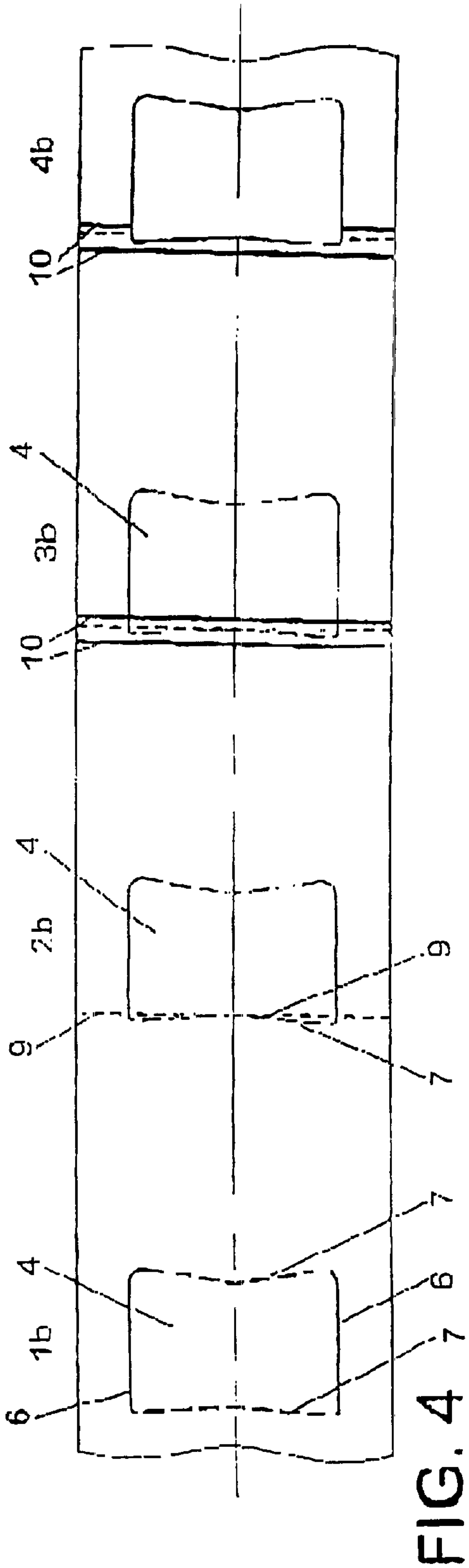

FIG. 4 is a further example of a process course according to the method wherein the transverse cutting lines 7 have a small angle relative to a line perpendicular to the film web 5, which—by use of a rotary die-cutting process—yields a certain reduction in the necessary cutting power. Following the establishment of all cutting lines 6,7 in a process step 1*b,* the establishment of the perforation line 9 is effected in a subsequent step 2*b.* It is not required to establish a perforation line 9 in the area between the two longitudinally extending cutting lines 6 as shown, but it will have no significance it being the support points of the cutting line 7 that yield first and are torn by removal of the cutout 4. The example illustrates the flexibility also provided by the invention since it will be possible to make a number of different cutouts without ensuing need to exchange the perforation blade.

Figure 5:
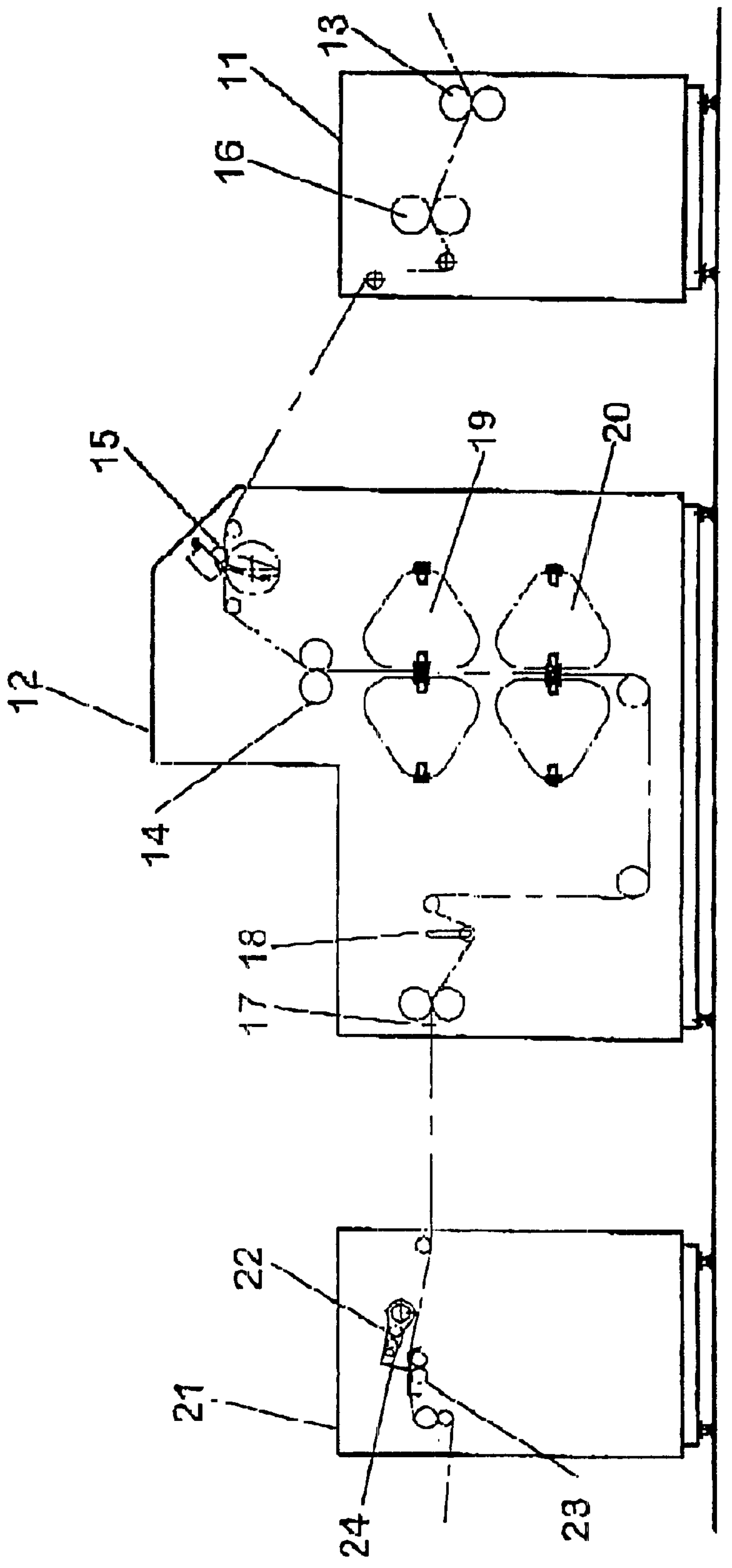
FIG. 5 shows a complete plant for forming plastics bags.

FIG. 5 illustrates a complete plant with workstations 11,12,21; 11 for forming the die-cutting, 12 for forming the perforation and the welding seams, and 21 for removing the cutouts. At the entry of the workstation 11 a first set of clamp rollers 13 is provided, and in the station 12 following a perforation tool 15 a second set of clamp rollers 14 is provided. Between the pairs of clamp rollers 13 and 14 a high film tension is maintained whereby the cutout accomplished when a die-cutting roller 16 passes the film, and the perforation is effected in a film section with high web tension.

Following the clamp roller pair 14 and onwards to a further pair of clamp rollers 17, the tension in the web of film is kept low, and in this film section it is monitored by a measuring unit 18 for web tension. In this section the film is conveyed through one or two welding stations 19 and 20. Herein the transverse welding seams are formed on the film, either in one or two steps.

In the workstation 21, the cutouts are removed by an arm 22 which is pivotally journalled above the web of film pressing the cutout down between two clamp rollers 23 that engage around the cutout and which, due to the rotation of the clamp rollers 23, convey the cutout away from the film while tearing the support points 8. To this end, the movement of the arm 22 is synchronised with the passage across the cutout by the pair of clamp rollers 23. At its extremity, the arm can be provided with a forked depression part 24 wherein the forked parts match into grooves in the one or both clamp rollers which means that the film in the area between the grooves can be engaged without said forked parts being engaged by the clamp rollers.

What is claimed is:

1. A method of forming cutouts (4) and transverse welding seams (10) in a web of film (5) that is advanced continuously at high velocity, wherein the cutouts (4) constitute areas that are delimited by cutting lines (6,7) with first cutting lines (6) that extend longitudinally of the web of film (5), and second cutting lines (7) that extend transversally of the web of film (5), said cutting lines (7) featuring a number of interruptions (8) that constitute support points whereby the cutouts (4) continue to be coherent with the web of film (5) at the support points (8), and subsequent formation of the transverse welding seams (10) in a web section with low web tension characterized in that the formation of the cutouts (4) is carried out in a web section with high web tension by means of first blade parts for forming the first cutting lines (6) and second blade parts having interruptions for forming the second cutting lines (7) with interruptions.

2. A method according to claim 1, characterized in that a welding seam (10) is formed on each side of one of the cutting lines (7) that extend transversely to the web of film (5), and that, between the welding seams (10) a perforation (9) is configured that extends transversally to the web of film.

3. A method according to claim 2, characterised in that the transverse perforations (9) and one of the cutting lines (7)

that extend transversely to the web of film (5) coincide in an area and are formed in the same process step, and wherein the perforations (9) in the area where the two coincide are constituted by the cutting line (7).

4. A method according to claim 2, characterised in that the transverse perforations (9) and one of the cutting lines (7) that extend transversely to the web of film (5) extend side-by-side in an area and are formed in each their process step.

5. A method according to claim 1, characterized in that the cutout (4) is removed by tearing of the support points (8) in a final process step.

6. A method according to claim 5, characterized in that the tearing is accomplished by an arm (22) pressing the cutouts (4) down between a set of rotating clamp rollers (23) that tear the cutouts (4) completely off, wherein the movements of said arm (22) are synchronised with the passage of the cutouts (4) across the clamp rollers (23).

7. An apparatus for manufacturing cutouts (4) and transverse welding seams (10) in a web of film (5) that is advanced continuously at high velocity, wherein the cutouts (4) constitute sections that are delimited by cutting lines (6,7), wherein a first workstation (11) is configured for forming cutouts (4) that are delimited by cutting lines (6,7) in the longitudinal and transverse directions of the film, and that a subsequent welding station (12) is configured for forming transverse welding seams (10) characterized in that first blade parts form the cutting line (6) in the longitudinal direction of the web of film (5), and that second blade parts form the cutting lines (7) in the transverse direction of the web of film (5) and have interruptions with a view to forming cutting lines (7) with interruptions (8).

8. An apparatus according to claim 7, characterised in that the welding station (12) is configured for forming a welding seam (10) on each side of the cutting lines (7) that extend transversally of the web of film (5), and that a perforation tool is also provided that is configured for providing a transverse perforation (9) between the two welding seams (10).

9. An apparatus according to claim 7, characterised in comprising a further workstation that is configured for removing the cutout (4) from the web of film (5) by tearing of the support points (8).

10. An apparatus according to claim 9, characterised in that the further workstation (21) comprises two clamp rollers (23) that are operated in mutual abutment in the immediate vicinity of the web of film (5), and a lever (22) which is pivotally journalled on the side of the web of film (5) which is opposite that of the clamp rollers (23), said lever being configured such that, by pivotal movement thereof, it presses a web section at least within the cutouts (4) out of the plane of the web of film and into the area where the two clamp rollers (23) abut on each other.

11. A method according to claim 2, characterized in that the cutout (4) is removed by tearing of the support points (8) in a final process step.

12. A method according to claim 3, characterized in that the cutout (4) is removed by tearing of the support points (8) in a final process step.

13. A method according to claim 4, characterized in that the cutout (4) is removed by tearing of the support points (8) in a final process step.

* * * * *